(12) United States Patent
Kido et al.

(10) Patent No.: US 7,007,449 B2
(45) Date of Patent: Mar. 7, 2006

(54) ONION HARVESTER WITH LEAF TOPPER

(76) Inventors: Duane Kido, P.O. Box 1043, Parma, ID (US) 83660; David Shuff, P.O. Box 1043, Parma, ID (US) 83660

( * ) Notice: Subject to any disclaimer, the term of this patent is extended or adjusted under 35 U.S.C. 154(b) by 0 days.

(21) Appl. No.: 10/815,470

(22) Filed: Mar. 31, 2004

(65) Prior Publication Data

US 2004/0216441 A1    Nov. 4, 2004

Related U.S. Application Data

(60) Provisional application No. 60/459,386, filed on Mar. 31, 2003.

(51) Int. Cl.
   *A01D 46/00*    (2006.01)
(52) U.S. Cl. .................... 56/327.1; 56/328.1
(58) Field of Classification Search ............ 56/327.1, 56/328.1, 121.4; 460/123, 134, 135, 136, 460/137, 138, 139, 140, 144
   See application file for complete search history.

(56) References Cited

U.S. PATENT DOCUMENTS

| | | | |
|---|---|---|---|
| 894,262 A | 7/1908 | Ellinwood | |
| 1,067,378 A | 7/1913 | Shane | |
| 1,086,631 A | 2/1914 | Weaver | |
| 1,439,187 A | 12/1922 | Pocock | |
| 2,525,018 A | 10/1950 | Corwin | 55/66 |
| 2,625,781 A | 1/1953 | Tateyama | 55/106 |
| 2,833,357 A | 5/1958 | Lust | 171/37 |
| 2,927,616 A * | 3/1960 | Bruner | 99/640 |
| 3,597,909 A * | 8/1971 | Lauridsen et al. | 56/327.1 |
| 3,636,999 A * | 1/1972 | Cordes | 99/636 |
| 3,747,514 A * | 7/1973 | Ireland | 99/640 |
| 3,989,110 A | 11/1976 | Medlock et al. | 171/28 |
| 4,275,649 A | 6/1981 | Peterson et al. | 100/4 |
| 4,430,933 A * | 2/1984 | Boots | 99/641 |
| 4,629,005 A | 12/1986 | Hood, Jr. et al. | 171/20 |
| 4,730,554 A * | 3/1988 | Kristiaan | 99/546 |
| 4,842,126 A * | 6/1989 | McConnell | 198/666 |
| 5,107,664 A | 4/1992 | Ross et al. | 56/121.4 |
| 5,197,549 A | 3/1993 | Shuff | 171/17 |
| 5,207,277 A | 5/1993 | Medlock | 171/38 |
| 5,363,634 A | 11/1994 | Saito | 56/121.42 |
| 5,431,231 A | 7/1995 | Abe et al. | 171/26 |
| 5,750,171 A | 5/1998 | Shuknecht | 426/481 |
| 5,778,771 A | 7/1998 | Heimbuch | 99/637 |
| 6,443,234 B1 * | 9/2002 | Raymond | 171/31 |

\* cited by examiner

*Primary Examiner*—Meredith C. Petravick
(74) *Attorney, Agent, or Firm*—Pedersen & Co., PLLC; Ken J. Pedersen; Barbara S. Pedersen

(57) ABSTRACT

An orientation system for vegetables includes a plurality of rotating rollers that both pull the vegetable into an inverted position, with leafy top down, and advance the vegetable along the length of the rollers to deliver the vegetables to a cutting system. The orientation system may be included in a vegetable harvester and topper or may be used separate from the harvester vehicle. The orientation system preferably has a plurality of orientation roller pairs, made up of first and second counter-rotating orientation rollers. These rollers may include strips of elastomeric fingers or other protrusions that engage the leafy top and pull it downward. Preferably, one of the rollers may also have a vegetable advancing spiral that moves the vegetables in "auger-style" by pushing the vegetables along in front of the rotating spiral. These rollers deliver the vegetables to the cutting system in the inverted position, so that the leafy top, when cut off, falls down to a trash removal system and the vegetable roots/bulbs' momentum carries them past the cutting system into another portion of the harvester for further processing or collection.

23 Claims, 7 Drawing Sheets

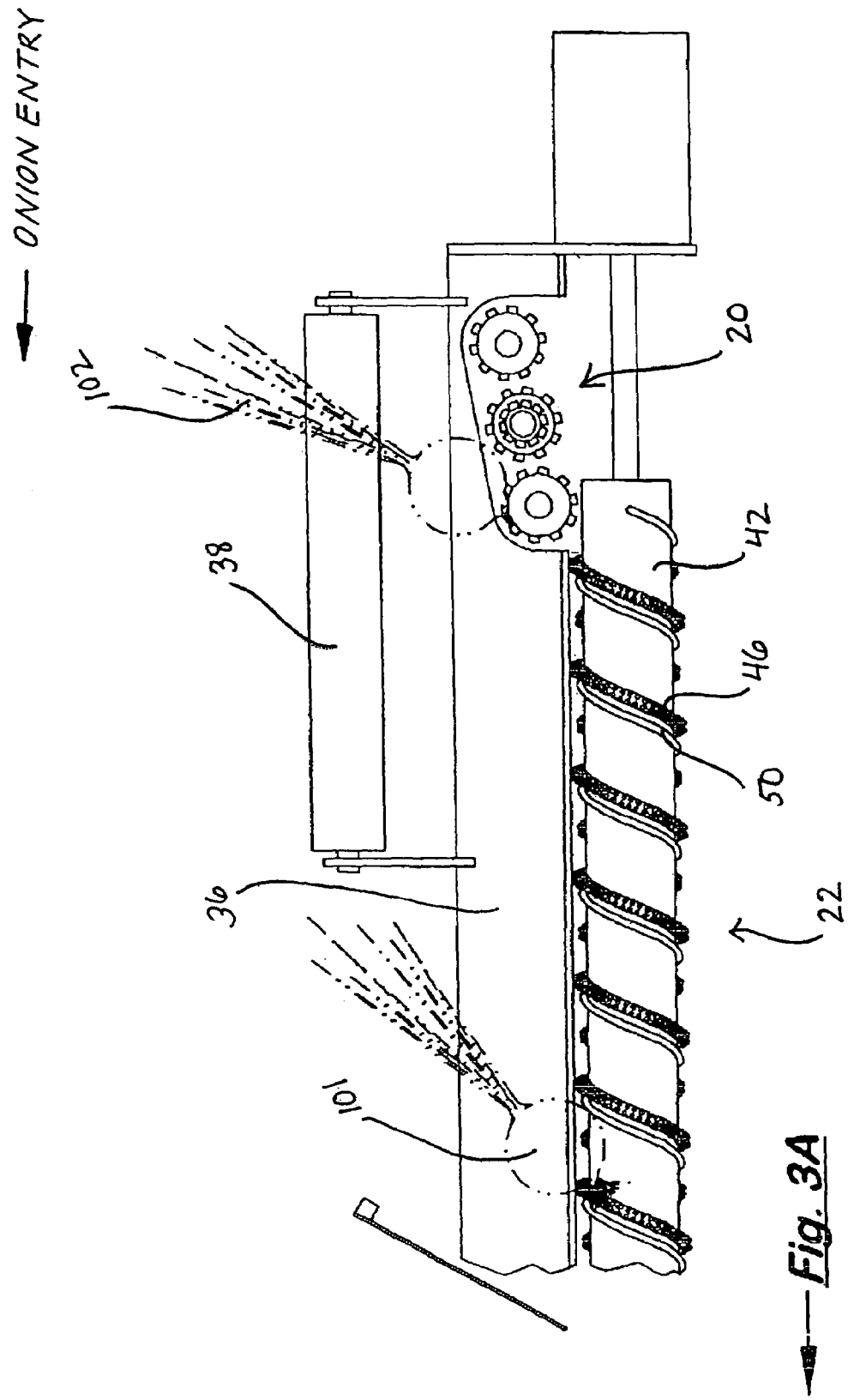

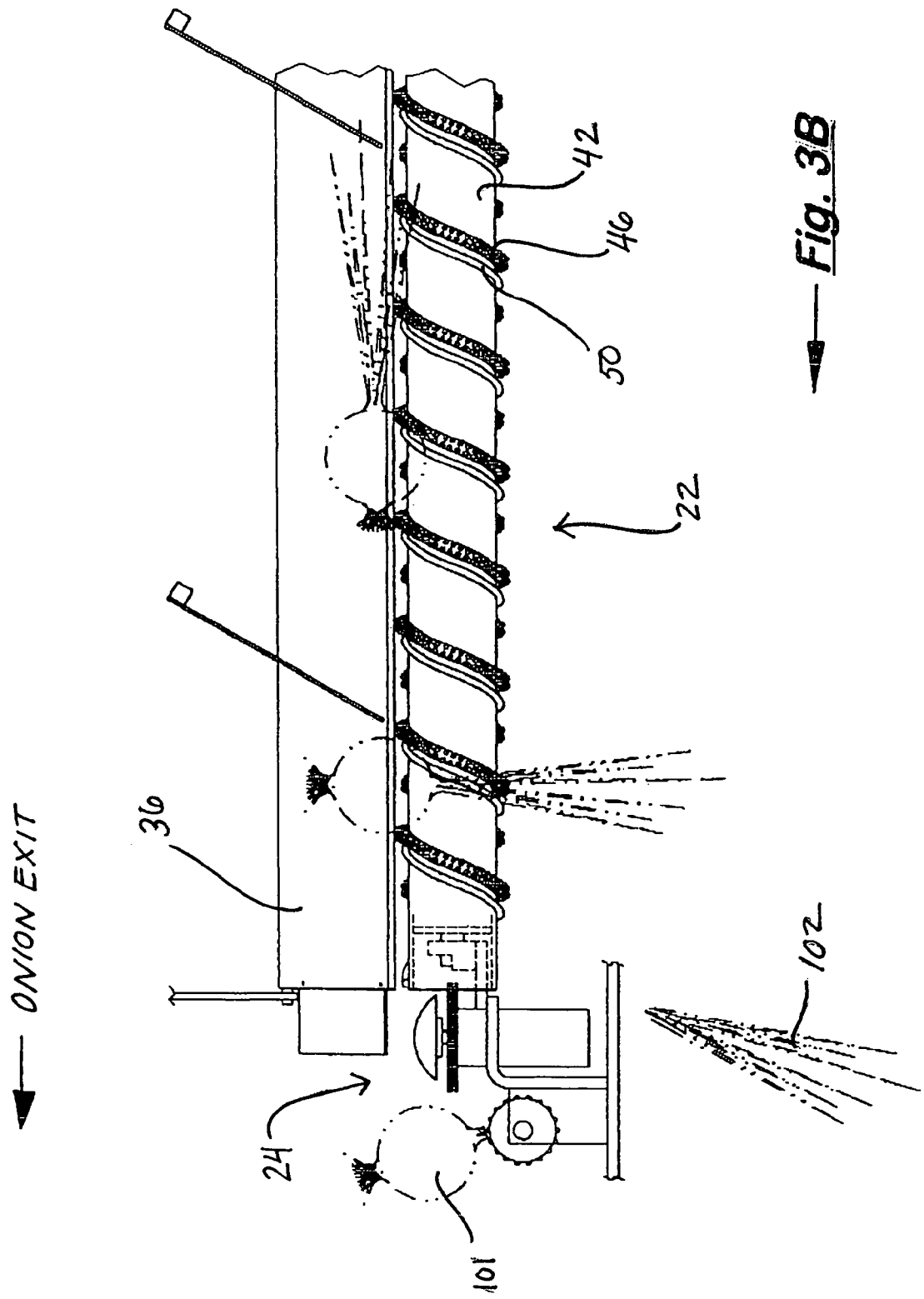

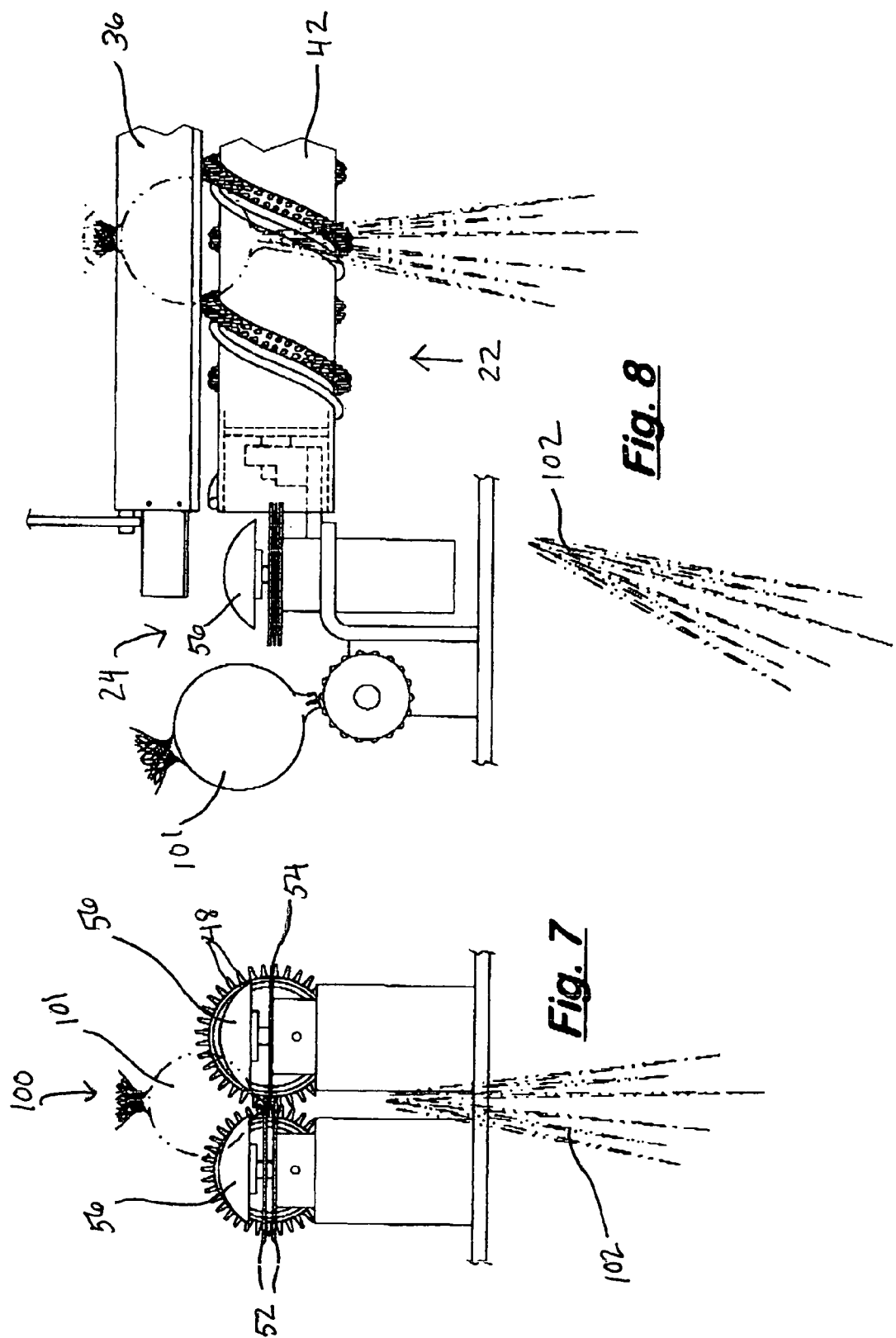

ONION HARVESTER WITH LEAF TOPPER

This application claims priority from U.S. Provisional Application Ser. No. 60/459,386, filed on Mar. 31, 2003, entitled "Onion Harvester With Leaf Topper," the disclosure of which is incorporated herein by this reference.

BACKGROUND OF THE INVENTION

1. Field of the Invention

This invention relates to vegetable harvesting and more particularly to leaf topping vegetables, such as bulb onions.

2. Related Art

Typically bulb onions are harvested by uprooting them with a breaker bar that is pulled in the soil beneath the onions thereby surfacing the bulbs. In many cases the leafy tops of these uprooted onions are manually cut before the bulbs are removed from the field. In other situations, the untopped onions are first harvested and then manually topped at the packing area. However, the manual processes are slow, expensive, and prone to injuring workers.

As a consequence to the above problems, many inventors have addressed the general problem of harvesting vegetables and the more specific problem of leaf topping. Issued patents relevant to the extant invention are reviewed hereinafter. As early as 1908, Ellinwood (U.S. Pat. No. 894,262) disclosed equipment that lifts cabbages from the ground by grasping the cabbage head between two cooperating "sprocket chains" and moving the heads to a region where the root stumps are cut off by opposed and cooperating cutting disks. Although not a leaf topper, Ellinwood's invention set the basis for many of the improvements that followed.

Tateyama in (U.S. Pat. No. 2,625,781) teaches an onion harvesting machine that includes forwardly projecting fingers to lift the onion tops while the onions are still in the soil. The tops are then grasped between a pair of opposed and inclined wedge shaped belts. After the onion top is grasped the forward motion of the machine and the incline of the moving belts pull the onions from the soil. The belts then transport the onions past a pair of cutting blades (disks) to remove the tops.

Hood et al. (U.S. Pat. No. 4,629,005) invented a harvester for bulb, root and leafy vegetable products that includes cutting surfaces forced through the soil to uproot the product. The leafy tops are then grasped between a cooperating pair of moving belts to bring the product to an area where they are reoriented to a horizontal disposition. The inventors allow for the removal of the leafy tops by providing an optional cutter operating adjacent to the entrance of the product to the grasping belts. The cutter comprises a pair of cutter blades or, alternatively, a pair of overlapping cutting discs.

Ross et al. (U.S. Pat. No. 5,107,664) discloses a vegetable topper for cutting the leafy tops off of tubers, such as onions, as they lie in the field. Ross provides a vegetable topper that uses a vacuum to lift the tops for cutting. A linearly reciprocating sickle blade provides the cutting action. An assortment of conveying devices handle the movement of the bulbs both before and after the topping process.

U.S. Pat. No. 5,197,549 discloses an onion topper that may include a front-end gathering and lifting assembly, a transport assembly, and a horizontal cutting table provided by a moving chain conveyor. A fan beneath the cutting table may blow a stream of air upwardly through suitable ducting to raise the leaf tops of the onions where a reciprocating sickle-cutting member then removes them. The cut onion top may be blown out a discharge chute by the same stream of air and the onion bulbs exit at the back of the machine via a discharge assembly.

Matlock (U.S. Pat. No. 5,207,277) teaches a "bulb harvester" with structure for lifting the bulb foliage for presentation to the "crack" between a pair of upwardly inclined moving belts. With these belts the bulbs are moved rearward on the machine where the lifted foliage encounters a second and lower "crack" between a second pair of belts. The sharper incline of the first pair of belts with respect to the lower belt draws the bulb upward until the upper portion of the bulb rests against the bottom plane of the lower belt. Subsequently a set of interleaved cutting wheels operating just above the lower belt remove the bulb's foliage (leafy top).

Saito (U.S. Pat. No. 5,363,634), in a manner similar to Ross et al. provides a vegetable topper that uses a vacuum to lift the tops for cutting. A linearly reciprocating sickle blade provides the cutting action. An assortment of conveying devices handle the movement of the bulbs both before and after the topping process.

Abe (U.S. Pat. No. 5,431,231) discloses a harvester for root vegetables that is similar to other patents described above that incorporate inclined belt conveyors that grip the foliage for presentation to rotating cutter wheels.

Shuknecht (U.S. Pat. No. 5,750,171) teaches a plurality of longitudinal, parallel, generally horizontal, and spaced moving belts for moving bulbs through the apparatus. Adjacent belts operating at differing speeds cause the bulbs to rotate and gyrate randomly as they are being conveyed. The motion of the onions causes the bulbs to assume momentarily an attitude to permit the uncut stems to extend downwardly between the belts. Below and close to the belts is a rotating blade for cutting the momentarily depending bulb stems (tops or roots).

Helmbuch (U.S. Pat. No. 5,778,771) provides a vegetable topper that includes a plurality of spaced rollers which are mounted on a pair of laterally spaced roller chain loops such that the rollers are able to freely spin relative to the roller chains. The rollers define a bed on which vegetables flow along the bed generally perpendicular to the rotational axes of the rollers. As the vegetable (e.g. onions) move along the rollers, their tops tend to drop downwards between the spaced rollers wherein they encounter cutter blades. Helmbuch also provides rotating paddle wheels having a plurality of flexible paddle wheel fins disposed below the roller spaces. The rotating fins engage the onions to further promote the downward positioning of the tops for presentation to the cutting blades.

It is clear from the prior patent activity that harvesting vegetables, and bulb onions in particular, has been a vexing issue. Close study of the prior art shows evolutionary progress but clearly there is room for improvement in terms of simplicity, safety, productivity and versatility. Many of the existing harvesting machines integrate the process of extracting the onions from the soil along with the topping operation. This adds additional complexity to an already difficult process thus reducing reliability and overall productivity. Another problem with existing harvesters and leaf toppers is their relatively poor performance in damp soils and with wet leaf tops.

Also, in many geographical regions, for example, in the southern United States, onions are typically harvested when the aboveground portion of the plants are still quite succulent. This presents a particular problem in that topping apparatus can rapidly become fouled with sticky onion juice causing the machine to jam and also to often leave an undesirable stain or residue on succeeding bulbs.

SUMMARY OF THE INVENTION

The present invention comprises a leaf topping system that may be used in a harvesting machine in the field or in a remote location, such as a warehouse or food processing plant. The leaf topping system includes a plurality of rotating rollers that covey the vegetable toward a cutting station and orient the vegetable in position for cutting off the leafy or unwanted portion of the vegetable. Further, the invention may comprise a cutting station that receives the vegetable from rollers in an inverted orientation, cuts the leaf top or unwanted portion from the vegetable for delivery to a waste removal station.

In a preferred embodiment, the leaf topping system is included in a motorized harvesting unit. Preferably, the harvesting unit includes a vegetable collection apparatus; a dirt separator; a pre-inspection station; a separation and singulation system; an orientation system; a cutting mechanism; and, a post-inspection station. Preferably, the collection apparatus includes a digging mechanism and a first elevation mechanism. Preferably, the harvester includes a second elevation mechanism for conveying the onions from the cutting mechanism to the post-inspection station, and/or a bagging station or a truck (not shown).

The harvester preferably digs/uproots the vegetables, but optionally may be adapted to collect vegetables already uprooted by another machine. In the preferred embodiment, the harvester is advanced through the vegetable field uprooting the vegetables and passing the vegetables via the collection apparatus to the dirt separator where soil and debris is removed from the vegetables. The dirt separator then delivers the vegetables to the pre-inspection station. At this station, the vegetables may be inspected by crew-members and remaining debris, such as rocks may be removed by the crew-members, after which the vegetables enter the separation and simulation system. Preferably, the separation and singulation system comprises rotating cylindrical rollers, divider rollers, and partitions, which ensure that the vegetables are separated from one another and passed to the orientation system.

Preferably, the orientation system includes counter-rotating, cooperating rollers that orient the leaf tops in an inverted position while simultaneously moving the vegetable in auger fashion toward the cutting mechanism. The preferred orientation system has pairs of said counter-rotating orientation rollers, each pair having an advancing roller and an adjacent inverting orientation roller, wherein both the advancing roller and the inverting orientation roller include a spiral or other arrangement of flexible fingers or other flexible members. The advancing roller also includes a vegetable advancing member, for example, a spiral that pushes the onion or vegetable in auger fashion towards the cutting mechanism. Preferably, the cutting mechanism comprises a plurality of cooperating, rotating, grabbing, and/or cutting members that remove the leaf tops. The vegetables are then transported by the second elevation mechanism to the post-inspection station, and/or bagging station or truck.

Thus it is a primary object of the invention to provide a vegetable harvester and leaf topper that is effective under all operating environments from very dry to very wet. It is also an object of this invention to provide a vegetable harvester and leaf topper that is particularly adapted for use with bulb onions. It is still another object of this invention to provide a harvester that facilitates collection of the vegetables from the field, inspection of the product and its final sacking or conveyance to a storage bin or truck. It is yet another object of this invention to provide a harvester that has a minimal operating crew and yet has a very high productivity rate. It is yet another object of this invention to provide a harvester that is reliable and maximizes the safety of its operating crew.

BRIEF DESCRIPTION OF THE DRAWINGS

FIG. 3A is a partial side view of one embodiment of the separation and singulation system and approximately the first half of the orientation system of the harvesters of FIGS. 1 and 2.

FIG. 3B is a partial side view of approximately the second half of the orientation system and the cutting mechanism of FIG. 3A.

FIG. 7 is an end view of the embodiments of FIGS. 3A–6 as the vegetable passes from the orientation system to the cutting mechanism.

FIG. 8 is a partial side view of embodiments of FIGS. 3A–7 as the vegetable passes from the orientation system to the cutting mechanism.

DESCRIPTION OF THE PREFERRED EMBODIMENTS

Figure 1:
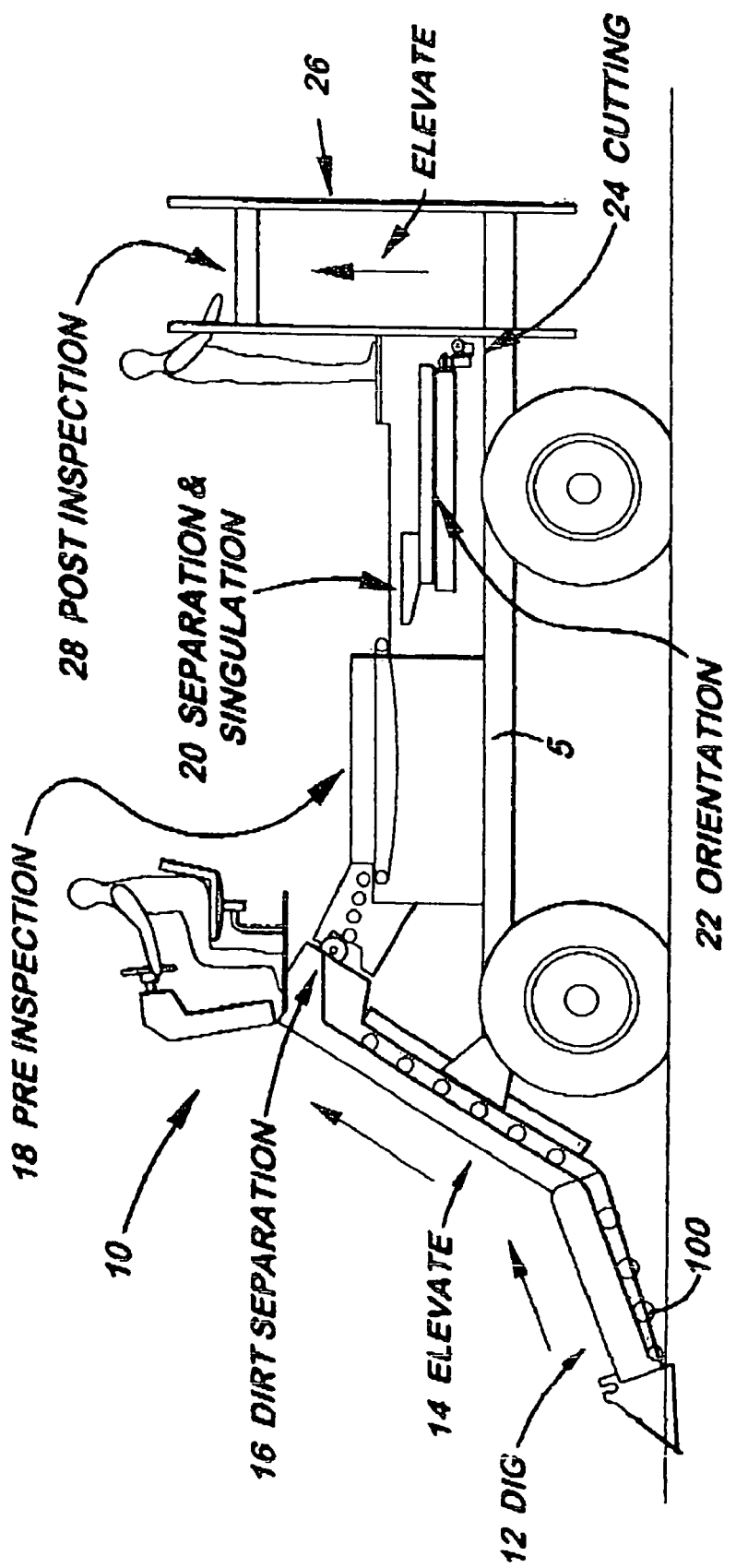
FIG. 1 is a side view of one embodiment of the invented harvester and leaf topper.
Figure 2:
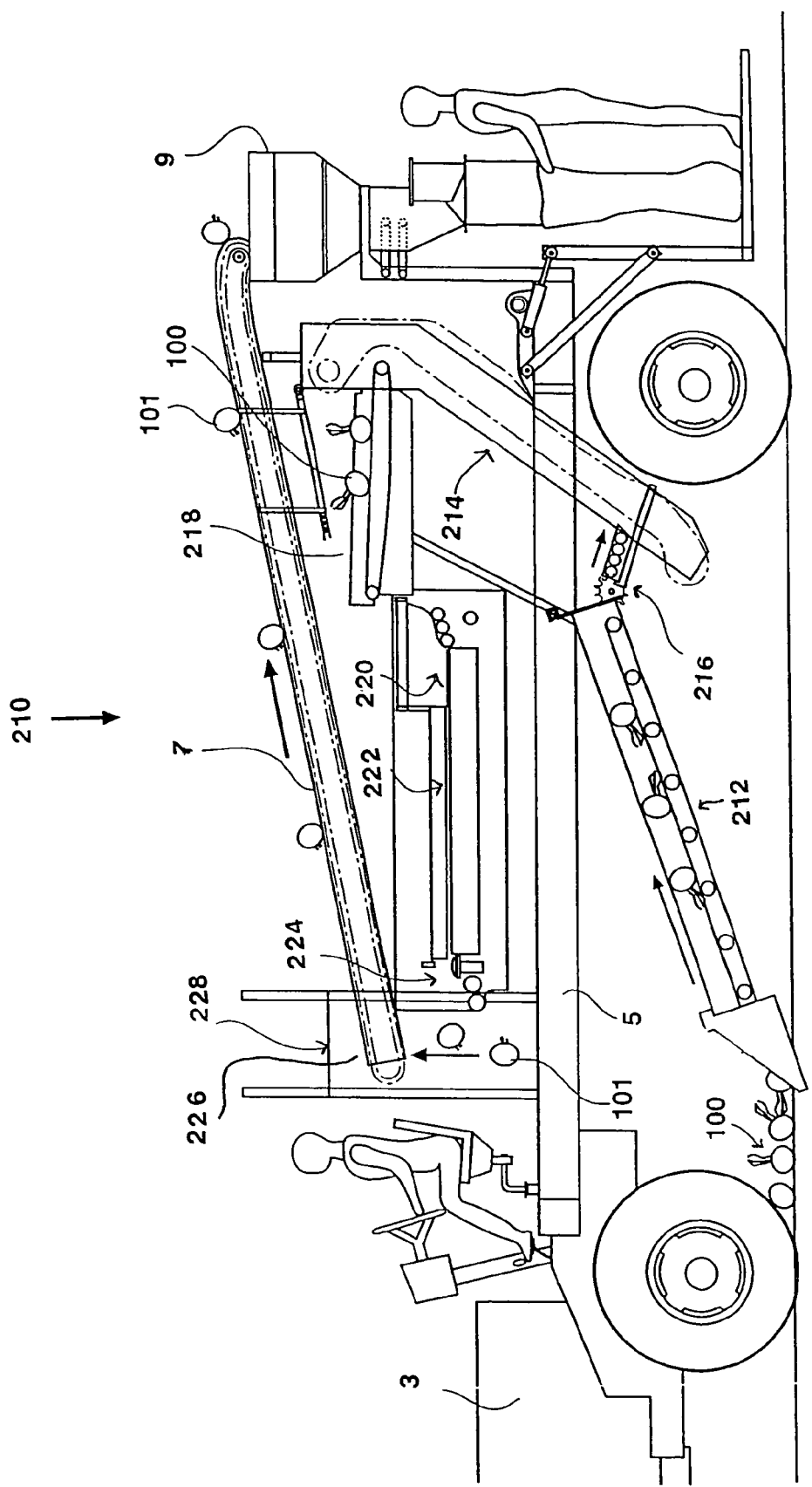
FIG. 2 is an alternative, less-preferred embodiment of the invented harvester and leaf topper.

Referring to the Figures, there are shown some, but not the only, embodiments of the present invention, which is referred herein as an orientation and/or cutting system for vegetables, and also embodiments of the invented leaf topping system and vegetable harvester that may include the orientation and/or cutting system. FIGS. 1 and 2 illustrate two of the many possible arrangements of the preferred stations and systems for a harvester and topper unit, wherein a portion of the especially preferred harvester and topper unit 10, 210 are designed to cut a top leafy portion 102 of a vegetable from a bottom bulb portion 101 of the vegetable, such as an onion.

In the preferred embodiment, the harvester and topper unit 10, 210 comprises a wheeled support frame 5 including a motor 3, or other means for propulsion. The preferred harvesting and topper unit 10, 210 includes a vegetable collection apparatus 12, 212; a first elevation mechanism 14, 214; a dirt separator 16, 216; a pre-inspection station 18, 218; a separation and singulation system 20, 220; an orientation system 22, 222; a cutting mechanism 24, 224; a second elevation mechanism 26, 226; and, a post inspection station 28, 228 (see FIGS. 1 and 2). Additionally, FIG. 2 illustrates a bagger collecting the onions from a depository/storage bin 9 in a bag as one possible method for the final handling of the onion bulbs 101. However, there are other methods of final handling, for example the onion bulbs 101 could be deposited into a truck or other machine (not shown) moving adjacent to the harvester 10, 110.

In the preferred embodiment, the collection apparatus 12 digs up onions 100 that are below the surface of the soil (see FIG. 1) however, the collection apparatus 12 may be adapted for collecting onions 100 that have been previously dug from the soil and are lying on the ground (see FIG. 2). In the preferred embodiment, collection apparatus 12 includes digging or other elements that disrupt the soil to loosen the onion bulbs 102 from the soil and elements that collect the onions 100 from the loosened soil and lift the onions 100 to an elevation mechanism 14. Various digging mechanisms may be used including several known in the art of vegetable and onion harvesting.

The preferred elevation mechanism 14 coveys the onions to the dirt separator 16 via conventional methods of elevation. The dirt separator 16 removes the dirt from the onions 100 by conventional dirt separating mechanisms, such as ribbed clod rollers and acorn rollers, wherein the onions move along the rollers and the contact of the onions, and spaces between the rollers allow dirt, rocks, and debris to fall away from the onions 100 without bruising the onions 100. The onions 100 are then delivered to the pre-inspection station 18, 218 wherein a worker may stand adjacent to the pre-inspection station 18, 218 to inspect the onions 100 for damage and to pick out any rocks or other debris. The onions 100 are then conveyed by conventional methods to the separation and singulation system 20, 220.

The separation and singulation system 20, 220 comprises a plurality of transition rollers 30 positioned transversely relative to the direction of travel of the harvester 10. The system 20, 220 also comprises a plurality of divider rollers 38 and divider walls 36 positioned parallel to the direction of travel (see FIGS. 3A and 4) and in between each pair of orientation rollers.

The preferred combination of transition rollers 30 includes acorn roller(s) 32 positioned between cylindrical, ribbed clod rollers 34, however other combinations, numbers and types of members may be used. Preferably the transition rollers 30 are grooved or channeled for gently engaging the surfaces of the onions 100 and moving them towards the orientation system 22, 222.

Figure 4:
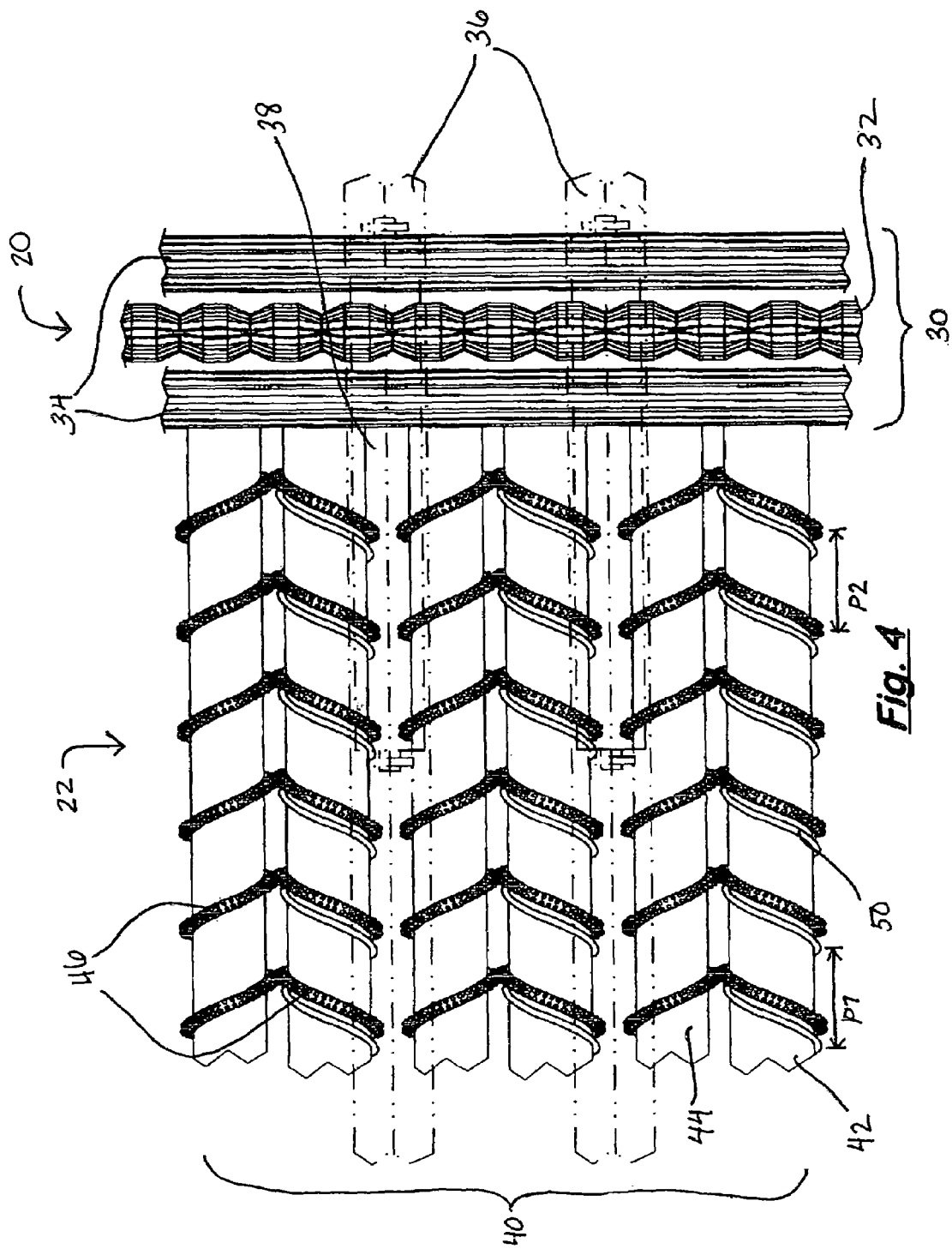
FIG. 4 is a partial top view of the separation and singulation system and orientation system of FIGS. 3A–3B.

As shown in FIGS. 3A and 4, the divider rollers 38 are spaced apart (preferably about 11 inches center-to-center) and positioned above the transition rollers 30 parallel to the orientation rollers. These divider rollers 38 freely-rotate and have very smooth surfaces, so that, as onions fall into the area above the transition rollers, the onions tend to fall against the divider rollers 38, which freely-rotating rollers 38 direct/divert the onions toward the center vertical plane between the two rollers in the respective pair of orientation rollers. In other words, the divider rollers 38 tend to center the onions to a plane directly above the gap between the advancing roller 42 and the inverting roller 44 of the respective pair, properly positioning the onions to enter the orientation system.

The divider walls 36 are preferably positioned above the transition rollers 30 and extend along the orientation system 22, 222 between the pairs of orientation rollers 40 (one advancing roller 42 and an adjacent inverting orientation roller 44). In the preferred embodiment, the dividers 36 are an inverted-V-shape (or convex when viewed from the top) and their sides extend towards the separation 30 and orientation 40 rollers. The preferred spacing between the divider walls 36 is about 11 inches (between about 10.75 inches to 11.125 inches). The shape and spacing between the divider walls 36 further helps retain the onions in their proper "lane," progressing along a straight line on top of their respective pair of orientation rollers. In other words, the divider walls 36 help keep groups of onions 100 in a single line and prevent them from moving between pairs of orientation rollers 40.

Figure 5:
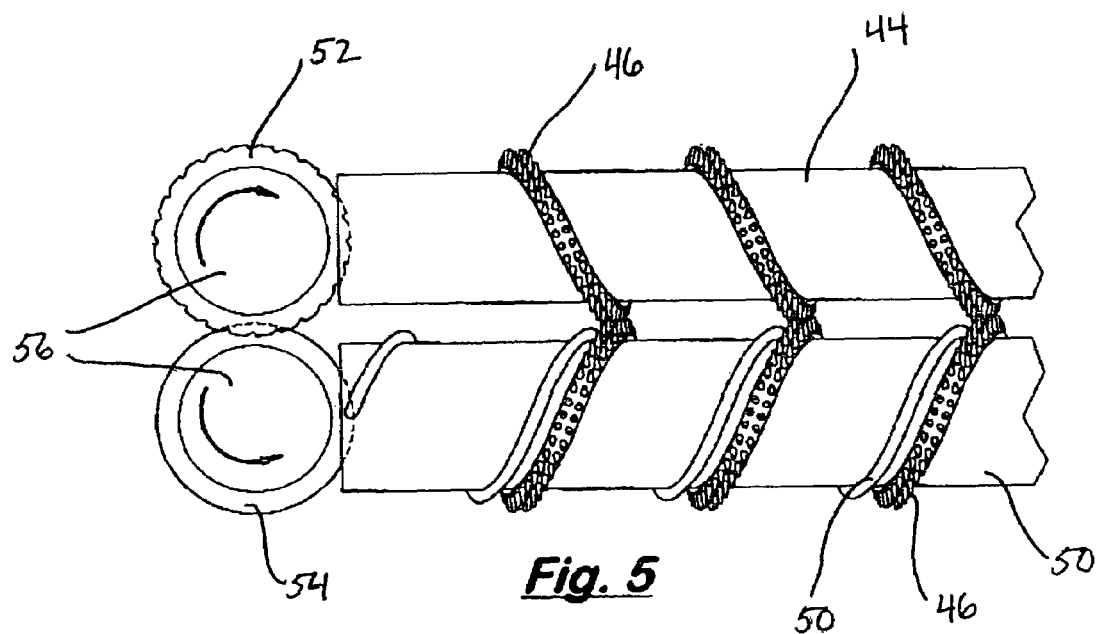
FIG. 5 is a partial top of the orientation system and cutting mechanism of FIGS. 3A–4.

From the separation and singulation system 20, 220, the onions enter the orientation system 22, 222. In the preferred embodiment, the orientation system 22, 222 comprises a plurality of cylindrical, counter-rotating, and cooperating rollers that orient the vegetable leaf tops 102 in an inverted position while simultaneously moving the vegetables in auger fashion toward the cutting mechanism 24, 224 (see FIGS. 3A and 3B). Preferably, the roller axes have a parallel relationship with each other and with the direction of travel of the harvester 10 and vegetables through the harvester 10. Preferably, the orientation system 22, 222 includes multiple pairs of cooperating rollers 40, each pair having one inverting roller 44 and one advancing roller 42 (see FIG. 5). In the preferred embodiment, both the inverting roller 44 and the advancing roller 42 comprise a spiral of flexible fingers 46 over substantially the entire length of the roller, as shown in FIGS. 4 and 5. Preferably, the flexible finger spirals 46 are made of rubber and have a plurality of protruding finger-like appendages 48 extending outward from, and perpendicular to the orientation rollers 40. Preferably, the spiral of flexible fingers 46 on the inverting roller 44 intermesh or come near to each other (less than or equal to 0.5 inches apart, preferably) and cooperate with the spiral of flexible fingers 46 on the adjacent advancing roller 42. In the preferred embodiment, the advancing roller 42 has an additional spiral that is positioned adjacent to the flexible finger spiral 46, which additional spiral is advancing spiral 50. Advancing spiral 50 is rounded and may be formed from stainless steel, or other hard materials.

In the preferred embodiment, the pitch P1 between any two spiral threads of advancing spiral 50 is preferably approximately 5". Also, the pitch P2 between any two spiral threads of the finger spirals 46 is preferably approximately 5".

Figure 6:
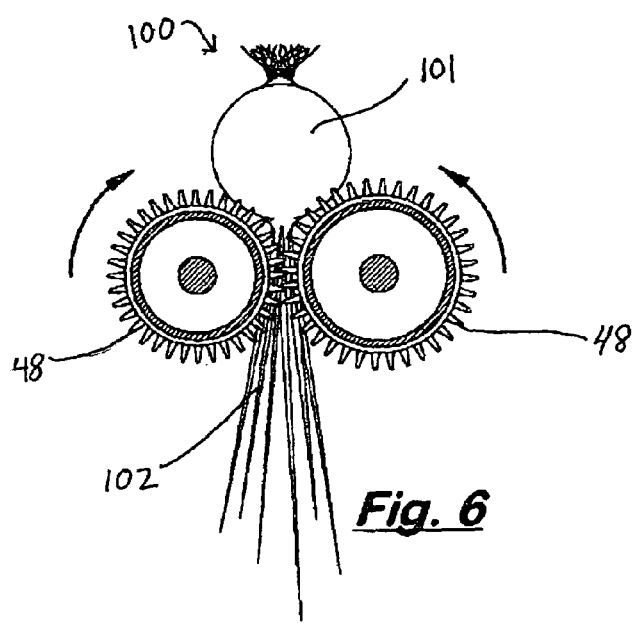
FIG. 6 is an end view of the embodiments of FIGS. 3A–5 as a vegetable passes through the orientation system.

As the onions 100 fall on to the orientation rollers 40 from the separation and singulation system 20, 220, they are cushioned by the flexible finger spirals 46 on either or both the inverting roller 44 and advancing roller 42. It is preferred that the finger spiral 46 on at least the advancing roller 42 extends all the way to the entry end of the roller 42 to cushion the onions 100 from falling directing on the hard advancing spiral 50. Within a short time, the onions 100 are resting ahead of and/or against the advancing spiral 50 on the advancing roller 42, as shown in FIGS. 3A and 3B. The advancing spiral 50 conveys the onions 100 in an auger like fashion along the orientation rollers 40. As the onions 100 move along the orientation rollers 40, the leafy portions 102 become engaged by or entangled in the flexible finger spirals 46 on one or both orientation rollers 40 because the leafy portions 102 are straggling in any direction from the bulb 101. As the orientation rollers 40 counter-rotate and the flexible finger spirals 46 move to the underside of the orientation rollers 40, the leafy portions 102 of the onions 100 are driven downward, forcing the onions 100 into an inverted position (see FIG. 6). Once the leafy portions 102 are under the orientation rollers 40, the leafy portions 102 disengage from the flexible fingers appendages 48 and remain below the orientation rollers, as shown in FIGS. 3B and 6. The onions 100 remain in an inverted position (the bulbs 101 above the orientation rollers 40 and the leafy portions 102 below the orientation rollers 40) as they are advanced along the length of the rollers 40 to the cutting station 24, 224.

In the preferred embodiment, the cutting station 24, 224 comprises two grabbing blades 52 and one cutting blade 54, however other combinations and designs of grabbing and/or cutting blades may be used. Preferably, the grabbing blades 52 are circular in shape, with serrated edges/teeth that may either be straight or curved and inclined at various angles. The serrated edges/teeth help move the leaf tops 102 past the cutting blade 54. Preferably, the cutting blade 54 is also circular in shape with a sharp edge. In the preferred embodiment, the grabbing blades 52 are placed co-axially, one above the other, with a spaced apart relationship. Preferably, the cutting blade 54 is positioned laterally and between the grabbing blades 52, as shown in FIG. 7. As shown in FIG. 8, the onion bulbs 101 move above the blades preferably riding on rotating caps 56, the leafy portions 102 are grabbed by the grabbing blades 52 and the cutting blade 54 slices the leafy portions 102 from the bulbs 101 at the neck (part of the onion where the leafy portion attaches to the bulb). Caps 56 are illustrated in FIGS. 7 and 8 as rounded caps. The leafy portion 102 then falls to a waste removal that distributes the leafy portions 102 to the ground, and the bulb 101 falls into the final elevation mechanism 26, 226 for elevation by conventional methods to the post-inspection station 28, 228. The inventor envisions a person or people next to the post-inspection station 28, 228 to check the onions 100 for damage or incomplete topping. The onion bulbs 101 may then be collected by a truck driving adjacent to the harvester 10, or in an alternative embodiment (see FIG. 2) the onions 100 are moved by a conveyer 7 to a depository 9, wherein a person holds a bag under the depository 9 for collection of the onion bulbs 101. Other conventional methods of collection may be used for the collection or "final handling" of the onion bulbs 101.

Example Dimensions for 3–5" Onions

While the inventors envision that the orientation and cutting technology disclosed herein will find many uses in solids handling and particularly in crop handling, an especially preferred embodiment is incorporated in a harvester and topper for summer onions that are typically harvested when they have grown to approximately 3–5" in bulb diameter. With the invented technology, a harvester and topper that is harvesting 4 beds (16 rows) of onions may handle up to about 45,000 pounds of onions an hour. Such onion bulbs tend to be spherical, but other non-spherical bulb or root vegetables may also be effectively handled by the invented apparatus. For the preferred summer onions, the following dimensions and features have been found effective.

In the preferred embodiment, the orientation rollers counter-rotate at the same rpm in the range of 200–400 rpm, but preferably at about 300 rpm. Typically, the advancing and inverting orientation rollers are about 3–5" in diameter and between 48–60" in length, with the preferred diameter for the advancing and inverting rollers being 4.5" and the preferred length being 56". This length and diameter has been found effective for ensuring that the onions are inverted before they arrive at the cutting mechanism. One or both of the orientation rollers could be switched out for rollers with different diameters to accommodate different onion diameters, or more specifically to increase the gap between the advancing and inverting rollers for onions with a greater neck diameter. Alternatively, the gap between the rollers in each pair may be adjusted by other means, such as a system that moves axes of the rollers relative to each other. Typically, the distance between the advancing and inverting rollers is in the range of 0.75–2" with the preferred distance between 0.75–1.25". Using an advancing roller of 4.5" and an inverting roller of 4" has been found to be an ideal combination for large, 4–5" diameter onions.

The orientation rollers may optionally be coated by Teflon® or other non-stick materials to enhance the non-abrasive, smooth surface of the rollers. This may help prevent damage to the onions which will in turn help prevent onion juice coating parts of the apparatus, and combining with dust to form a sticky residue.

In the preferred embodiment the orientation rollers comprise both an advancing roller and an inverting roller, wherein the advancing roller has both an advancing spiral and a flexible finger spiral, and the inverting roller only has a flexible finger spiral. The advancing spiral around the advancing roller may be a 0.3–0.5" diameter rod or another rounded form that is attached to or integral with the surface of the advancing roller, with rounding features to ensure that no sharp edges are presented to the onions as they fall onto or move along the advancing roller. Most preferably, the advancing spiral has a diameter of 0.375". The flexible finger spiral may be attached to both the advancing and inverting roller by various conventional methods, but preferably by the finger extensions being attached to a thin metal strip, for example a 22 gauge metal strip riveted to the roller. The finger appendages may be about 0.1–0.2" in diameter, with 0.125" in diameter being preferable, and the length being about 0.5–1", with 0.75" preferable. The finger appendages are long enough for the fingers to intermesh or at least come close enough to each other to effectively engage the onion tops and pull them down between the rollers. The flexible fingers shown in the Figures are arranged in two rows on each spiral and each spiral is wound around its respective roller so that the rows of fingers on one roller will extend between the rows of fingers on the adjacent roller. This way they may "intermesh", but do not touch and therefore do not wear out quickly. The two rows of fingers on each spiral may be about ⅝" apart, and the individual fingers in a given row may be about ⅝" apart, for example. The preferred pitch, or distance between two spiral threads (both the advancing and flexible finger spiral threads) is 5" for onions with a diameter of 3–5".

Known systems (not shown) are incorporated for operating and synchronizing the movements of the vegetable collection apparatus, the dirt separator, the first and second mechanisms for elevating, the pre-inspection station, the separation and singulation system, the orientation system, the cutting mechanism, vegetable transfer conveyors, and post-inspection station. In the preferred embodiment, the operation and synchronization of the several components and mechanisms may be achieved, for example, by known chain-sprocket-roller assemblies and gear trains powered by hydraulic motors.

It is important to note that in addition to the invented operating harvester and leaf topper, an independent leaf topping apparatus may be formed by combining the above described separation and singulation system, the orientation system and the cutting mechanism, or selected parts thereof. Such an independent topping apparatus could be located, for example, in a warehouse and could be fed from bulk storage or conveyors. In this manner, the novel features of these cooperating components may be applied for the benefit and improvement of other available vegetable harvesting machines.

Although this invention has been described above with reference to particular means, materials and embodiments, it is to be understood that the invention is not limited to these disclosed particulars, but extends to all equivalents within the broad scope of this disclosure and within the scope of the following example claims.

We claim:

1. A handling system for vegetables with a root portion and a leafy portion comprising:
   an orientation system comprising a pair of counter-rotating rollers, at least one of said rollers comprising a spiral on its outer surface adapted to move the vegetable along said pair in a direction parallel to the rollers, and at least one of said rollers comprising a member adapted to engage and pull the leafy portion down between said rollers while said root portion remains above said rollers;
   a dividing mechanism for directing a plurality of said vegetables to fall on said pair of rollers in a row parallel to said pair of rollers, wherein said dividing mechanism comprises a plurality of freely-rotating rollers positioned above and parallel to said pair of rollers.

2. The handling system of claim 1, wherein the rollers of the pair are parallel and separated from each other to create a gap between the rollers, and wherein each of said rollers of the pair comprises a member adapted to engage and pull the leafy portion down through the gap and to a position between and below said rollers while said root portion remains above said rollers.

3. The handling system of claim 1, further comprising a cutting mechanism positioned to receive the vegetable from said pair of rollers and comprising at least one blade adapted to sever said leafy portion from the vegetable.

4. The handling system of claim 3, wherein said rollers are horizontal and said blade is horizontal, so that said pair of rollers ejects the vegetable past said blade.

5. The handling system of claim 3, wherein said rollers are horizontal and wherein said cutting mechanism comprises a plurality of circular, horizontal blades, wherein said rollers ejects the vegetable horizontally past said circular blades.

6. The handling system of claim 1 wherein said spiral is a rigid coil on said outer surface.

7. The handling system of claim 1 wherein said member comprises a plurality of flexible protrusions extending generally radially out from said at least one roller.

8. The handling system of claim 7, wherein said flexible protrusions extend from a strip wound around said at least one roller.

9. The handling system of claim 5, wherein said plurality of circular blades comprises a first grabbing disk, a second grabbing disk and a cutting disk, each disk having an axis of rotation, said first and second grabbing disks being placed co-axially one above the other and having a spaced apart relationship, the axis of the cutting disk being laterally displaced from the axes of the grabbing disks, the cutting disk being interleaved between the grabbing disks, and wherein said grabbing disks are serrated.

10. The handling system of claim 5, wherein said cutting mechanism comprises a cap, above said plurality of circular blades, for said vegetable to ride upon while being ejected horizontally past said circular blades.

11. The handling system of claim 10, wherein said cap is a rounded cap.

12. The handling system of claim 10, wherein said cap is a rotating cap.

13. The handling system of claim 1 wherein each of said pair of counter rotating rollers comprises a said member adapted to engage and pull the leafy portion, and each of said members adapted to engage and pull the leafy portion comprises an elastomeric finger strip having a plurality of protruding finger-like appendages extending outwardly from and perpendicular to the longitudinal axis of the roller, said finger-like appendages of each roller intermeshing and cooperating with the finger-like appendages on the adjacent roller in said pair of rollers.

14. A vegetable harvester and leaf topper comprising:
   a wheeled vehicle;
   a vegetable collection apparatus for introducing into the harvester uprooted vegetables from a field;
   an orientation station having a plurality of counter-rotating orientation roller pairs, each orientation roller pair having a first orientation roller and an adjacent second orientation roller, the first orientation roller including a first elastomeric finger strip and the second orientation roller including a second elastomeric finger strip and a vegetable advancing member;
   a cutting station receiving vegetables from said orientation station, said cutting station having a cutting member for removing vegetable leaf tops from the vegetables;
   a vegetable transfer system receiving topped vegetables from said cutting station for conveying off of the harvester and leaf topper; and
   a separation device comprising a plurality of transition rollers disposed perpendicular to the direction of travel of the harvester and adapted to feed vegetables onto the orientation station, and divider rollers disposed parallel to the direction of travel between each of said roller pairs and adapted to deflect vegetables toward a vertical central plane between the rollers of each pair.

15. A vegetable harvester and leaf topper according to claim 14 wherein:
   the first and second orientation rollers are cylindrical, and each having a diameter, a length and an axis;
   the axes of said orientation rollers have a parallel relationship and are generally aligned with the direction of travel of the harvester;
   the first and second orientation rollers of each orientation roller pair further have a spaced apart relationship with each other; and
   the first and second orientation rollers of each orientation roller pair counter-rotate with respect to each other.

16. A vegetable harvester and leaf topper according to claim 14 wherein:
   the first elastomeric finger strip is spiral-wrapped around each first orientation roller over its length;
   the second elastomeric finger strip is spiral-wrapped around each second orientation roller over its length such that it is in continuous and cooperating contact with the first elastomeric strip along the length of the orientation rollers while they are counter-rotating with respect to each other; and
   the advancing member is spiral-wrapped immediately adjacent to the second finger strip over the length of the second orientation roller of each orientation roller pair.

17. A vegetable harvester and leaf topper comprising:
   a wheeled vehicle;
   a vegetable collection apparatus for introducing into the harvester uprooted vegetables from a field;
   an orientation station having a plurality of counter-rotating orientation roller pairs, each orientation roller pair having a first orientation roller and an adjacent second orientation roller, the first orientation roller including a first elastomeric finger strip and the second orientation roller including a second elastomeric finger strip and a vegetable advancing member;

a cutting station receiving vegetables from said orientation station, said cutting station having a cutting member for removing vegetable leaf tops from the vegetables; and a vegetable transfer system receiving topped vegetables from said cutting station for conveying off of the harvester and leaf topper;

wherein the first and second finger strips have a plurality of protruding finger-like appendages extending outwardly from and perpendicular to the axes of said orientation rollers, said finger-like appendages of each first orientation roller intermeshing and cooperating with the finger-like appendages on the adjacent second orientation roller.

18. A vegetable harvester and leaf topper according to claim 17 wherein said cutting station for removing vegetable leaf tops comprises a plurality of rotating grabbing and cutting disks.

19. A vegetable harvester and leaf topper comprising:

a wheeled vehicle;

a vegetable collection apparatus for introducing into the harvester uprooted vegetables from a field;

an orientation station having a plurality of counter-rotating orientation roller pairs, each orientation roller pair having a first orientation roller and an adjacent second orientation roller, the first orientation roller including a first elastomeric finger strip and the second orientation roller including a second elastomeric finger strip and a vegetable advancing member;

a cutting station receiving vegetables from said orientation station, said cutting station having a cutting member for removing vegetable leaf tops from the vegetables; and a vegetable transfer system receiving topped vegetables from said cutting station for conveying off of the harvester and leaf topper;

wherein:

the first and second orientation rollers are cylindrical, and each having a diameter, a length and an axis;

the axes of said orientation rollers have a parallel relationship and are generally aligned with the direction of travel of the harvester;

the first and second orientation rollers of each orientation roller pair further have a spaced apart relationship with each other; and the first and second orientation rollers of each orientation roller pair counter-rotate with respect to each other; and wherein said spaced apart relationship is adjustable.

20. A vegetable harvester and leaf topper comprising:

a wheeled vehicle;

a vegetable collection apparatus for introducing into the harvester uprooted vegetables from a field;

an orientation station having a plurality of counter-rotating orientation roller pairs, each orientation roller pair having a first orientation roller and an adjacent second orientation roller, the first orientation roller including a first elastomeric finger strip and the second orientation roller including a second elastomeric finger strip and a vegetable advancing member;

a cutting station receiving vegetables from said orientation station, said cutting station having a cutting member for removing vegetable leaf tops from the vegetables; and a vegetable transfer system receiving topped vegetables from said cutting station for conveying off of the harvester and leaf topper;

wherein said cutting station comprises a first grabbing disk, a second grabbing disk and a cutting disk, each disk having an axis of rotation, said first and second grabbing disks being placed co-axially one above the other and having a spaced apart relationship, the axis of the cutting disk being laterally displaced from the axes of the grabbing disks, the cutting disk being interleaved between the grabbing disks;

wherein the grabbing disks are serrated.

21. The vegetable harvester and leaf topper as in claim 20 wherein the cutting station further comprises a cap above said grabbing disks and a cap above said cutting disk.

22. The vegetable harvester and leaf topper as in claim 21 wherein the cap above said grabbing disks is a rounded cap, and the cap above said cutting disk is a rounded cap.

23. The vegetable harvester and leaf topper as in claim 21 wherein the cap above said grabbing disks is a rotating cap, and the cap above said cutting disk is a rotating cap.

* * * * *